(12) United States Patent
Logvinov et al.

(10) Patent No.: US 11,752,893 B2
(45) Date of Patent: Sep. 12, 2023

(54) METHODS, DEVICES, AND SYSTEMS UTILIZING ELECTRIC VEHICLE CHARGING RESPONSIVE TO IDENTIFIED POWER SIGNATURES IN AN AGGREGATE POWER WAVEFORM

(71) Applicant: IoTecha Corp., Cranbury, NJ (US)

(72) Inventors: Oleg Logvinov, Asbury, NJ (US); Michael J. Macaluso, Jackson, NJ (US)

(73) Assignee: IoTecha Corp., Cranbury, NJ (US)

( * ) Notice: Subject to any disclaimer, the term of this patent is extended or adjusted under 35 U.S.C. 154(b) by 0 days.

(21) Appl. No.: 17/824,274

(22) Filed: May 25, 2022

(65) Prior Publication Data

US 2022/0289059 A1 Sep. 15, 2022

Related U.S. Application Data

(63) Continuation of application No. PCT/US2022/014863, filed on Feb. 2, 2022.
(Continued)

(51) Int. Cl.
*H02J 7/00* (2006.01)
*H02J 7/14* (2006.01)
(Continued)

(52) U.S. Cl.
CPC ............... *B60L 53/62* (2019.02); *B60L 53/64* (2019.02); *B60L 58/12* (2019.02); *B60L 53/51* (2019.02); *B60L 53/53* (2019.02)

(58) Field of Classification Search
CPC .......... B60L 53/62; B60L 53/64; B60L 53/51; B60L 53/53; B60L 53/50; B60L 58/12
(Continued)

(56) References Cited

U.S. PATENT DOCUMENTS

| | | | | |
|---|---|---|---|---|
| 7,197,390 | B2 * | 3/2007 | Yuan | H02K 1/148 318/685 |
| 2003/0098211 | A1 * | 5/2003 | Saito | B60R 16/0315 191/3 |

(Continued)

OTHER PUBLICATIONS

ISA/US, International Search Report and Written Opinion for PCT Patent Application No. PCT/US2022/014863, dated Apr. 27, 2022, 7 pages.
(Continued)

*Primary Examiner* — Alexis B Pacheco
(74) *Attorney, Agent, or Firm* — NK Patent Law

(57) ABSTRACT

The present disclosure describes a device for providing adaptive charging of an electric vehicle (EV). The device includes a memory and at least one processor configured for receiving a set of parameters of an aggregate power waveform carried on a power line from a set of sensors; receiving a set of relationships between a set of power signatures and a set of power sources; determining, using the set of parameters and the set of power signatures, a subset of the set of power signatures represented in the set of parameters; identifying, using the subset of the set of power signatures and the set of relationships between the set of power signatures and the set of power sources, a subset of the set of power sources contributing to the aggregate power waveform; and controlling, responsive to identifying identified subset of the set of power sources, a charging circuit.

17 Claims, 8 Drawing Sheets

Related U.S. Application Data

(60) Provisional application No. 63/144,889, filed on Feb. 2, 2021.

(51) Int. Cl.
*B60L 53/62* (2019.01)
*B60L 53/64* (2019.01)
*B60L 58/12* (2019.01)
*B60L 53/51* (2019.01)
*B60L 53/53* (2019.01)

(58) Field of Classification Search
USPC .......................................................... 320/109
See application file for complete search history.

(56) References Cited

U.S. PATENT DOCUMENTS

| | | | |
|---|---|---|---|
| 2011/0148221 A1 | 6/2011 | Trotter et al. | |
| 2011/0302078 A1* | 12/2011 | Failing ................. | B60L 53/126 |
| | | | 700/297 |
| 2012/0153732 A1* | 6/2012 | Kurs ..................... | B60L 53/64 |
| | | | 307/104 |
| 2012/0197693 A1* | 8/2012 | Karner .................. | B60L 53/31 |
| | | | 705/14.1 |
| 2012/0200266 A1* | 8/2012 | Berkowitz ............ | H01M 10/44 |
| | | | 320/139 |
| 2014/0175872 A1* | 6/2014 | Morii .................... | B60L 15/2009 |
| | | | 307/10.1 |
| 2014/0176051 A1* | 6/2014 | Hayashi ................ | H02J 7/007 |
| | | | 320/162 |
| 2016/0052413 A1* | 2/2016 | Shimizu ................ | H04W 4/027 |
| | | | 700/291 |
| 2017/0033408 A1* | 2/2017 | O'Hora ................. | H02J 7/0048 |
| 2017/0110895 A1 | 4/2017 | Low et al. | |
| 2018/0105060 A1* | 4/2018 | Mcquillen ............ | H02J 7/0068 |
| 2018/0257499 A1* | 9/2018 | Velev .................... | C25B 9/17 |
| 2019/0061546 A1* | 2/2019 | Miftakhov ............ | H02J 3/322 |
| 2020/0023747 A1 | 1/2020 | Logvinov et al. | |
| 2020/0139842 A1 | 5/2020 | Logvinov et al. | |
| 2022/0001762 A1* | 1/2022 | Farkas .................. | H02J 7/0045 |
| 2022/0140610 A1* | 5/2022 | Bangalore ............ | B60L 58/12 |
| | | | 320/101 |
| 2022/0239106 A1* | 7/2022 | Kubota ................. | B60L 53/51 |

OTHER PUBLICATIONS

Boulis, A. et al.: "Aggregation in Sensor Networks: An Energy-Accuracy Trade-off", Ad hoc 1-20 networks 1.2-3 (2003): 317-331. Sep. 2003, 12 pages.

Kayastha, N. et al.: "Smart grid sensor data collection, communication, and networking: a tutorial", Wireless Communications and Mobile Computing 2014, 14:1055-1087, Jul. 23, 2012, 33 pages.

\* cited by examiner

METHODS, DEVICES, AND SYSTEMS UTILIZING ELECTRIC VEHICLE CHARGING RESPONSIVE TO IDENTIFIED POWER SIGNATURES IN AN AGGREGATE POWER WAVEFORM

PRIORITY CLAIM

This application is a continuation application of International Patent Application Serial No. PCT/US2022/014863, entitled "METHODS, DEVICES, AND SYSTEMS UTILIZING ELECTRIC VEHICLE CHARGING RESPONSIVE TO IDENTIFIED POWER SIGNATURES IN AN AGGREGATE POWER WAVEFORM", filed Feb. 2, 2022, which claims priority to U.S. Provisional Patent Application Ser. No. 63/144,889, entitled "ELECTRIC VEHICLE CHARGING RESPONSIVE TO IDENTIFIED POWER SIGNATURES IN AN AGGREGATE POWER WAVEFORM," filed Feb. 2, 2021, the disclosures of which are incorporated herein by reference in their entireties.

TECHNICAL FIELD

The described embodiments generally relate to adaptive charging and, more particularly, to adaptive charging of electric vehicles (EVs).

BACKGROUND

Electric vehicles represent a meaningful percentage of today's vehicles, and their number is growing at a rapid rate. Electric vehicles often take the form of cars, trucks, and drones, but can also take the form of trains, buses, heavy equipment, and so on. While some electric vehicles (e.g., commuter trains) are charged while in use (e.g., via power rails installed above, below, or on the train's track), many electric vehicles (e.g., most cars, trucks, and drones) are charged while they are not in use. For example, a car may be charged at night while parked in a garage and coupled to an electrical power ecosystem, and then de-coupled from the electrical power ecosystem and driven to work. Similarly, a truck may be parked and coupled to an electrical power ecosystem when not in use, and then de-coupled from the electrical power ecosystem and driven along a service or delivery route. While some electric vehicles tend to be charged at the same location, at about the same time, and on a more or less daily basis, the use patterns of some electric vehicles result in them being charged at different locations, at different times, and while connected to different electrical power ecosystems (e.g., at home during the evening, at work during the day, at a restaurant during lunch or dinner, at a hotel, at a loading or delivery location, and so on). In some cases, the charging locations, times, or electrical power ecosystems may change in accordance with a periodic use pattern. In other cases, the charging locations, times, or electrical power ecosystems may change in accordance with a seemingly random use pattern.

As the number of electric vehicles continues to grow at a rapid rate, so too is the deployment of renewable energy resources growing at a rapid rate. Renewable energy sources (power sources) include, for example, solar, wind, geothermal and hydro energy sources. Batteries are also a renewable energy source, but need to be charged using energy produced by another renewable energy source or a non-renewable energy source. While some renewable energy sources tend to produce energy more or less continually (e.g., geothermal and hydro energy sources), the more common types of renewable energy sources (e.g., solar and wind energy sources) tend to produce energy periodically or intermittently. For example, photovoltaic cells only produce energy during the day, while the sun is shining; and wind turbines only produce energy when there is wind (but not when there is too little or too much wind). Batteries can produce a predetermined amount of energy, but then need to be recharged by another energy source and are therefore dependent on the availability and/or cost of the other energy source.

While utility electrical power ecosystems are generally available at all times (though not always), fluctuations in energy demand, the mobility of some loads (e.g., electric vehicles), and the intermittent contributions of power that renewable energy sources make to utility electrical power ecosystems, often result in utility power being billed at different costs at different times and/or different locations.

The above and other factors can make decisions on when and how much to charge an electric vehicle quite complex. These charging decisions become even more complex when a fleet of electric vehicles needs to be charged, or when an electrical power ecosystem is dependent primarily on renewable energy, or when electric vehicles need to be charged at a location that simultaneously has to meet the energy demands of heating and cooling equipment, commercial or industrial machines, and so on.

Accordingly, there remains a need for methods, devices, and systems for more efficiently transferring energy to batteries for other renewable and non-renewable energy sources.

SUMMARY

Disclosed herein are improved methods, devices, and systems for transferring energy to batteries from other renewable and non-renewable energy sources. Embodiments described in the present disclosure are further directed to adaptive charging and more specifically adaptive charging of electric vehicles (EVs).

In a single-family home environment, an electric vehicle can be one of the largest loads on the home's electrical power ecosystem. In a multi-family residential environment, or in a business, commercial, or industrial environment, a fleet of electric vehicles operated by the owner of the property, and/or a fleet of electric vehicles driven to the property by its residents or workers, can be one of the largest loads on the property's electrical power ecosystem. Described herein are adaptive charging controllers (ACCs) and adaptive charging managers (ACMs) that can be used to directly or indirectly control when and how much electric vehicles are charged, to satisfy constraints or goals such as: the energy budget (e.g., total energy used or total cost of energy used) of a property owner; the total energy need or peak energy demand of a property owner, its residents, and/or its workers; the charging needs and availability of electric vehicle users; the availability of renewable energy resources; the energy production capability of an energy utility; and so on. To satisfy or balance these constraints and goals, it is useful to know when an energy source (or power source) is generating power.

Often, the power produced by an electrical power ecosystem's power sources is aggregated and provided to a set of loads in an aggregate power waveform. The aggregate power waveform may be carried on a power line or lines, which power line(s) may be part of a node or network of power lines within the electrical power ecosystem. As described herein, an ACC may be configured to sense a set of parameters of this aggregate power waveform, determine one or more power signatures represented in the set of parameters, and then use the determined power signature(s) to identify a set of one or more power sources that are contributing to the aggregate power waveform. The ACC may sense the set of parameters of the aggregate power waveform over time, and in some cases may trend the set of power sources that contribute to the aggregate power waveform over time, and may make decisions regarding whether or when to charge an electric vehicle responsive to the particular subset of power sources that is contributing to the aggregate power waveform.

In another embodiment, the present disclosure describes a device for providing adaptive charging of an electric vehicle (EV). The device includes a memory and at least one processor configured for receiving a set of parameters of an aggregate power waveform carried on a power line from a set of sensors; receiving a set of relationships between a set of power signatures and a set of power sources; determining, using the set of parameters and the set of power signatures, a subset of the set of power signatures represented in the set of parameters; identifying, using the subset of the set of power signatures and the set of relationships between the set of power signatures and the set of power sources, a subset of the set of power sources contributing to the aggregate power waveform; and controlling, responsive to identifying identified subset of the set of power sources, a charging circuit, wherein the charging circuit is configured to be electrically coupled between the power line and the EV.

In another embodiment, the set of sensors includes a voltage monitor configured to sense a voltage waveform; and a current monitor configured to sense a current waveform.

In another embodiment, the processor is further configured for using the set of parameters for determining a fundamental frequency and a set of harmonics of at least one of the voltage waveform and the current waveform, and determining the subset of the set of power signatures is further based on the fundamental frequency and the set of harmonics.

In another embodiment, the processor is further configured for using the set of parameters for determining a stability of the fundamental frequency, and determining the subset of the set of power signatures is further based on the stability of the fundamental frequency.

In another embodiment, the processor is further configured for using the set of parameters for determining a waveform stability of at least one of the voltage waveform and the current waveform, and determining the subset of the set of power signatures is further based on the waveform stability.

In another embodiment, the processor is further configured for using the set of parameters for determining a waveform shape of at least one of the voltage waveform and the current waveform, and determining the subset of the set of power signatures is further based on the waveform shape.

In another embodiment, wherein the device includes a network interface configure for receiving at least one of the set of power signatures and the set of relationships between the set of power signatures and the set of power sources.

In another embodiment, the processor is further configured for determining a trend the subset of the set of power sources over time, and controlling the charging circuit is further based on the trend.

In another embodiment, the processor is further configured for determining a cost associated with charging the EV based on the subset of the set of power sources, and controlling the charging circuit is further based on the cost In another embodiment, the processor is further configured for receiving EV parameters associated with the EV, and controlling the charging circuit is further based on the EV parameters.

In another embodiment, the EV parameters include at least three of: a time by which the EV wants to be charged; an amount of charge wanted by the EV; a charging priority of the EV; a state of charge of the EV; a departure time of the EV; and a charge capacity of the EV.

In another embodiment, EV parameters are determined over an International Standards Organization (ISO) 15118 interface.

In another embodiment, the set of power signatures includes respective sets of parameters for each power signature in the set of power signatures; and the processor is further configured for: determining a variance between a set of parameters for a power signature in the set of power signatures and the set of parameters of the aggregate power waveform; identifying the power signature in the set of power signatures as represented in the set of parameters of the aggregate power waveform; and updating, to include the determined variance, the set of parameters for the power signature in the set of power signatures.

In another embodiment, the set of power sources includes: a utility power feed; a battery; a solar inverter; and a generator.

In another embodiment, the set of sensors and the charging circuit are coupled to a user premises electrical power ecosystem, behind a utility power meter connected between the user premises electrical power ecosystem and a utility electrical power ecosystem.

In another embodiment, the device includes the set of sensors.

In another embodiment, the device includes the charging circuit.

In another embodiment, the charging circuit includes a set of switches configured to switchably deliver power received on the power line to a set of loads.

In another embodiment, the present disclosure describes a programmatic method implemented on at least one processor for adaptive charging of an electric vehicle (EV), the programmatic method that includes receiving a set of parameters of an aggregate power waveform carried on a power line from a set of sensors; receiving a set of relationships between a set of power signatures and a set of power sources; determining, using the set of parameters and the set of power signatures, a subset of the set of power signatures represented in the set of parameters; identifying, using the subset of the set of power signatures and the set of relationships between the set of power signatures and the set of power sources, a subset of the set of power sources contributing to the aggregate power waveform; and controlling, responsive to identifying identified subset of the set of power sources, a charging circuit, wherein the charging circuit is configured to be electrically coupled between the power line and the EV.

In another embodiment, the present disclosure describes a non-transitory computer-readable storage medium, the non-transitory computer-readable storage medium storing instructions to be implemented on at least one processor, the instructions when executed by the at least one processor cause a device to perform a programmatic method for adaptive charging of an electric vehicle (EV), the programmatic method including: receiving a set of parameters of an aggregate power waveform carried on a power line from a set of sensors; receiving a set of relationships between a set of power signatures and a set of power sources; determining, using the set of parameters and the set of power signatures, a subset of the set of power signatures represented in the set of parameters; identifying, using the subset of the set of power signatures and the set of relationships between the set of power signatures and the set of power sources, a subset of the set of power sources contributing to the aggregate power waveform; and controlling, responsive to identifying identified subset of the set of power sources, a charging circuit, wherein the charging circuit is configured to be electrically coupled between the power line and the EV.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

Figure 1:
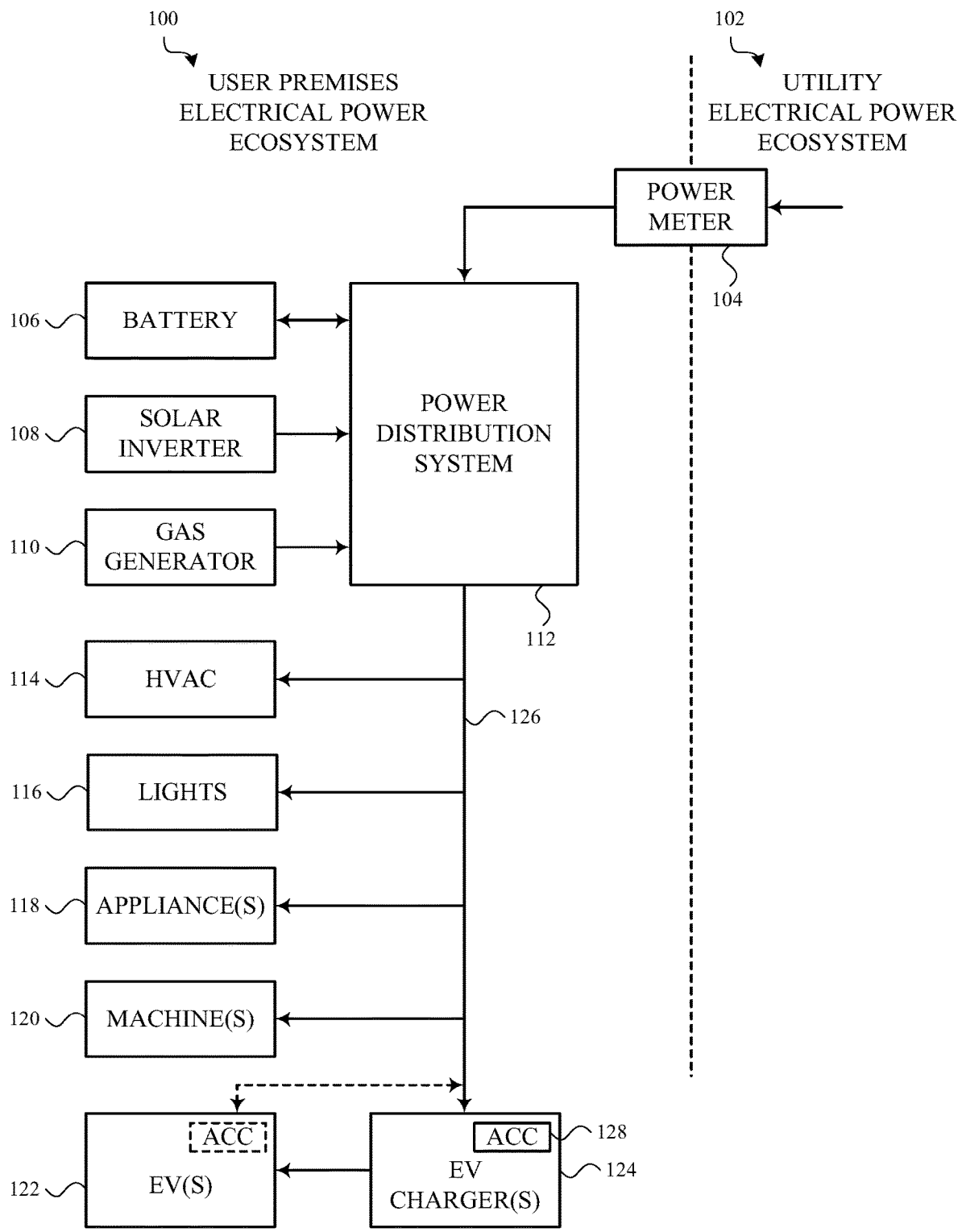
FIG. 1 depicts a block diagram illustrating a user premises electrical power ecosystem and a utility electrical power in accordance with embodiments of the present disclosure.

The proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are improved methods, devices, and systems for transferring energy to batteries from other renewable and non-renewable energy sources. Embodiments described in the present disclosure are further directed to adaptive charging and more specifically adaptive charging of electric vehicles (EVs).

Adaptive charging controllers (ACCs) and adaptive charger monitor (ACMs) described herein are designed to seamlessly integrate electric vehicle (EV) charging into an electrical power ecosystem and/or enable various charging goals or constraints to be satisfied. The term "electrical power ecosystem," as used herein, refers to a collection of power sources coupled to a power distribution device or system, which power distribution device or system aggregates the power produced by one or more of the power sources and outputs an aggregate power waveform on a set of one or more power lines. Electrical power ecosystems include utility electrical power ecosystems (i.e., electrical power ecosystems managed by a government-operated or private utility company) and user premises electrical power ecosystems (i.e., electrical power ecosystems that typically sit behind a utility power meter, or are unconnected to a utility electrical power ecosystem, and are managed to at least some degree by a property owner or resident).

In some embodiments, the ACCs and ACMs described herein may help shape a charging profile (the power consumed by charging over time) of one or more EVs, or of an electrical power ecosystem as a whole. The charging profile may be shaped in a way that provides an efficient use of power within the electrical power ecosystem. "Efficient use," in this context, may have various meanings. For example, in some instances, a charging profile that makes efficient use of power may tend to preserve backup power provided by a battery and/or generator for as long as possible, so that vital services may remain powered within an electrical power ecosystem. Thus, when an ACC or ACM determines that a battery and/or generator is one of the power sources contributing to the aggregate power of an electrical power ecosystem, the ACC or ACM may provide instructions or control signals that minimize EV charging (that is, in the absence of considerations that would tip a decision in favor of EV charging). As another example, a charging profile that makes efficient use of power may minimize how much power is used for EV charging unless an EV needs to be charged for a critical mission. In another example, a charging profile that makes efficient use of power may charge an EV when it determines both 1) that a solar inverter is contributing to the aggregate power of an electrical power ecosystem, and 2) other power demands of the electrical power ecosystem are being met. The EV may be charged even when it is not asking to be charged and is not scheduled for a critical mission, because solar power tends to have a lower cost in comparison to utility power or backup power.

ACCs and ACMs described herein help shape a charging profile and/or provide efficient power use by sensing a set of parameters of an aggregate power waveform provided by an electrical power ecosystem; determining one or more power signatures represented in the set of parameters; and then using the determined power signature(s) to identify a set of one or more power sources that are contributing to the aggregate power waveform. The power signatures can be sensed because each type of power source, and in some cases each particular power source, provides power that has a unique set of parameters, such as a unique frequency, frequency fluctuation, sinewave shape, and/or set of harmonics. For example, utility power may have particular spectral components defined by power quality norms, and may have a relatively stable frequency. In contrast, gas generator power may have significant voltage fluctuations, and may have a sinusoidal waveform that is not very smooth (e.g., gas generator power may have a lot of harmonics). Solar inverter power may have high-level harmonics that are characteristic of solar inverters. An ACC may sense the set of parameters of an aggregate power waveform over time, and in some cases may trend the set of power sources that contribute to the aggregate power waveform over time, and may make decisions regarding whether or when to charge an electric vehicle responsive to the particular subset of power sources that is contributing to the aggregate power waveform.

These and other systems, devices, methods, and apparatus are described with reference to FIGS. 1-8. However, those skilled in the art will readily appreciate that the detailed description given herein with respect to these figures is for explanatory purposes only and should not be construed as limiting.

FIG. 1 shows an example block diagram of a user premises electrical power ecosystem 100. The user premises electrical power ecosystem 100 may be a non-public, smaller scale electrical power ecosystem at, for example, a home, a residential complex, a farm, an office building, or a factory.

In some embodiments, the user premises electrical power ecosystem 100 may be connected to a utility electrical power ecosystem 102 (e.g., a utility power feed) by a utility power meter 104, with the user premises electrical power ecosystem 100 sitting "behind" the utility power meter 104. In these embodiments, the user premises electrical power ecosystem 100 may be statically connected to the utility electrical power ecosystem 102 (e.g., typically connected, absent a failure of the utility power meter 104 or the utility electrical power ecosystem 102, and absent intentional disconnection of the user premises electrical power ecosystem 100 from the utility power meter 104 or utility electrical power ecosystem 102) or dynamically connected to the utility electrical power ecosystem 102 (e.g., connected at times, under control of the utility power meter 104 or one or more other devices). The user premises electrical power ecosystem 100 may also operate independently of the utility electrical power ecosystem 102 (e.g., off-grid).

By way of example, the user premises electrical power ecosystem 100 may include a number of power sources including, for example, utility power (e.g., power received from the utility electrical power ecosystem 102 via the utility power meter 104), a battery 106, a solar inverter 108, a gas generator 110, a wind power source, a geothermal power source, and/or a hydropower source. In some cases, the user premises electrical power ecosystem 100 may not include one or more of these power sources, or may include more than one of these types of power sources, or may include one or more different types of power sources.

Outputs (feeds) from all of the power sources 102/104, 106, 108, 110 may be received at a power distribution device or system 112. The power distribution device or system 112 may in some cases just receive and aggregate power from the power sources 102/104, 106, 108, 110 and provide the power to one or more loads over a set of one or more power lines 126. In other cases, the power distribution device or system 112 may include breakers or fuses, power conditioning devices, regulators, switches, power monitors, and so on, and may condition power, monitor power, regulate and/or switch power to various loads, and so on.

The load(s) coupled to the power distribution device or system 112 may take various forms, and may include, for example, heating ventilation and cooling (HVAC) equipment 114, lights 116, one or more appliances 118, one or more machines 120, and/or one or more EVs 122. In some cases, the one or more EVs 122 may be coupled to the power distribution device or system 112 via one or more electric vehicle chargers 124, though they may alternatively be coupled directly to the power distribution device or system 112.

Some of the power sources 102/104, 106, 108, 110 may, at times, operate as a load. Conversely, some of the loads may, at times, operate as a power source. For example, the battery 106 may at times need to be charged and may operate as a load; or, the battery of an EV 122 may at times be used as a power source and power other loads.

Over time, the subset of power sources that provides power to the power distribution device or system 112, and ultimately to the set of loads 114-124, may vary. For example, the solar inverter 108 may only provide power during the day or when there is enough light to generate photovoltaic power. As another example, the gas generator 110 may provide power only when utility power is unavailable or the battery 106 may be, for example: 1) selectively activated to provide backup power when another power source is unavailable (e.g., when utility power is unavailable); 2) used to store excess power generated by the solar inverter, and then provide the stored excess power to the power distribution device or system 112 when the solar inverter is not generating power; or 3) used to provide excess power when there is a high demand for power by the set of loads 114-124.

Different ones of the power sources 102/104, 106, 108, 110 may have different characteristics or parameters. For example, utility power may have particular spectral components defined by power quality norms, and may have a relatively stable frequency. In contrast, gas generator power may have significant voltage fluctuations, and may have a sinusoidal waveform that is not very smooth (e.g., gas generator power may have a lot of harmonics). Solar inverter power may have high-level harmonics that are characteristic of solar inverters. Different types of power may also have different cost metrics, may be renewable or non-renewable, and may have different availabilities, and so on.

In some embodiments, an ACC 128 may be used in conjunction with the user premises electrical power ecosystem 100. The ACC 128 may determine whether or when to charge the EV 122 and/or whether or when to charge another battery coupled to the power distribution device or system 112. The ACC 128 may make its charging determination(s) in response to a determination or estimation of the subset of power sources 102/104, 106, 108, 110 that is contributing to the aggregate power waveform output by the power distribution device or system 112. In various embodiments, the ACC 128 may be incorporated into the EV 122 (e.g., into an onboard charger (OBC) of the EV 122), into the electric vehicle charger 124 (e.g., into electric vehicle supply equipment (EVSE)), or elsewhere behind the utility power meter 104.

Figure 2:
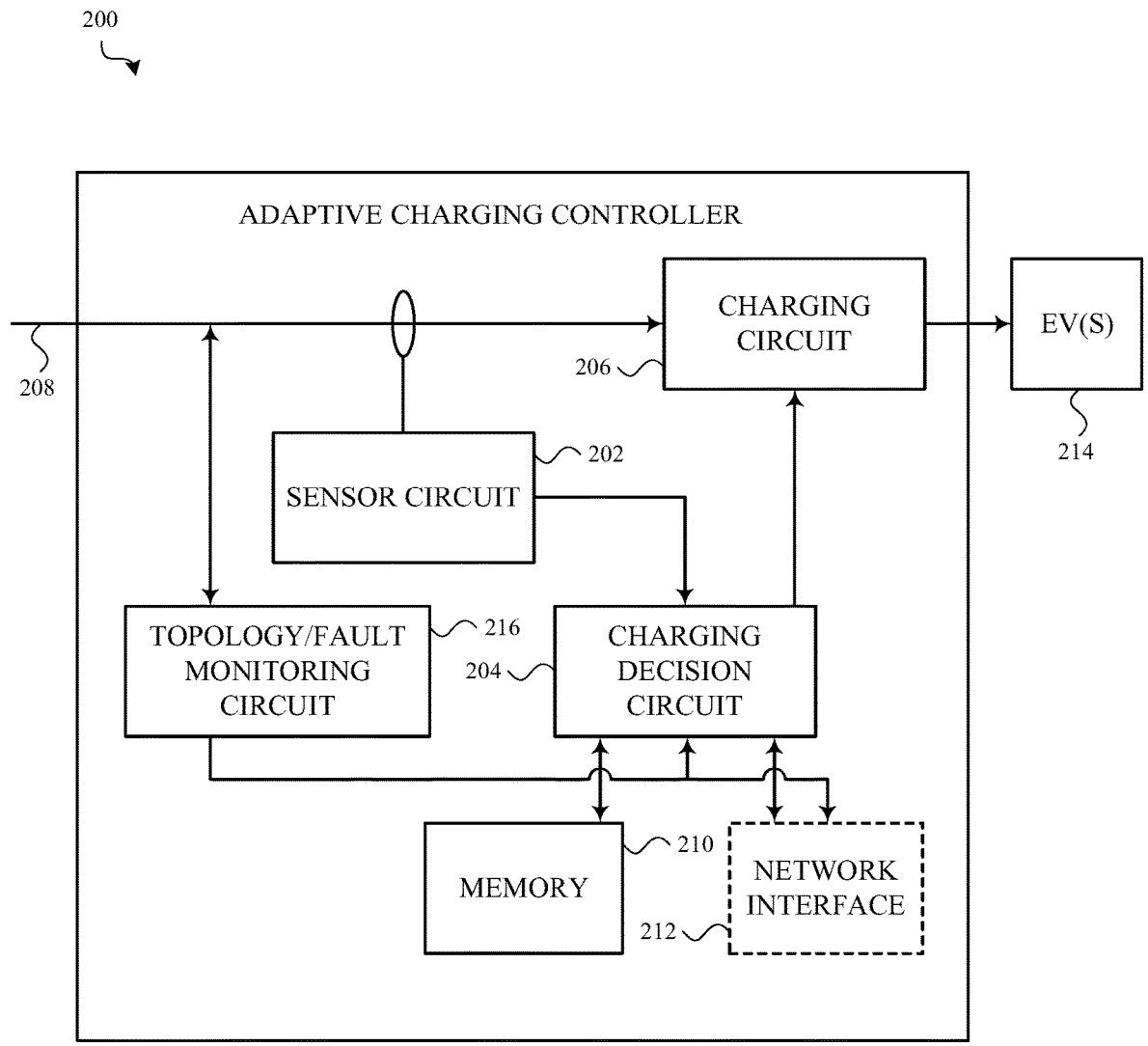
FIG. 2 depicts a block diagram illustrating an adaptive charging controller (ACC) in accordance with embodiments of the present disclosure.

FIG. 2 shows an example block diagram of an ACC 200, which in some cases may be the ACC described with reference to FIG. 1. The ACC 200 may include a sensor circuit 202, a charging decision circuit 204, and a charging circuit 206. In some cases, the charging decision circuit 204 may include a processor that executes a set of electronic instructions stored in memory, or may be instantiated by a processor, or may include other circuits or components. In some embodiments, the processor may be a singular or distributed processor including, for example, one or more of a microprocessor, a digital signal processor (DSP), a programmable logic controller (PLC), an application-specific integrated circuit (ASIC), a System on Chip (SoC), and so on.

The sensor circuit 202 may be configured to sense, over time, a set of parameters of an aggregate power waveform carried on a power line 208. The power line 208 may be, for example, a power feed for an EV or EV charger, or a power line elsewhere within a power distribution device or system when the ACC 200 is implemented apart from an EV or EV charger. For purposes of this description, an aggregate power waveform is a waveform produced by aggregating the power waveforms of a number of different power sources, as might occur within the power distribution device or system described with reference to FIG. 1 or at an output thereof. In some cases, an aggregate power waveform may also include power noise. It is noted, however, that the waveform sensed by the ACC 200 on the power line 208 may at times be a waveform output by a single power source (e.g., when only one power source of an electrical power ecosystem is producing power), or just noise (e.g., when no power source of the electrical power ecosystem is producing power).

The charging decision circuit 204 may use the set of parameters sensed by the sensor circuit 202 to identify a subset of power sources that is contributing to the aggregate power waveform. The identified subset of power sources may variously include some, all, or none of the power sources that are capable of contributing power to an electrical power ecosystem. In some cases, identifying the subset of power sources that is contributing to the aggregate power waveform may include retrieving a set of power signatures, and a set of relationships between the set of power signatures and a set of power sources. The set of power signatures and the set of relationships may be retrieved, for example, from a local memory 210 of the ACC 200, or from a remote server to which the ACC 200 connects, over a network, via an optional wired or wireless network interface 212. Each power signature may be defined by a set of parameters, which parameters are characteristic of a particular power source or type of power source.

The charging decision circuit 204 may use the sensed set of parameters and the retrieved set of power signatures to determine a subset of the set of power signatures represented in the sensed set of parameters. For example, the charging decision circuit 204 may analyze the sensed set of parameters to determine whether a first power signature is represented in the set of power signatures, to determine whether a second power signature in represented in the set of power signatures, and so on. The charging decision circuit 204 may analyze the sensed set of parameters for different power signatures sequentially or contemporaneously. The charging decision circuit 204 may determine that a power signature is represented in the set of parameters of the aggregate power waveform when a set of parameters associated with the power signature (or a close enough representation thereof) is determined to be represented in the set of parameters of the aggregate power waveform.

In some cases, the charging decision circuit 204 may determine, using the set of parameters of the aggregate power waveform, one or more higher level parameters or characteristics of the aggregate power waveform. The higher level parameters or characteristics may include, for example, a frequency of the aggregate power's voltage waveform or current waveform, a stability of the frequency, a stability of the voltage waveform or current waveform, a set of harmonics in at least one of the voltage waveform or current waveform, a shape of the voltage waveform or current waveform, and so on. These higher level parameters or characteristics may also be used by the charging decision circuit 204 (in combination with or instead of the sensed set of parameters of the aggregate power waveform) to determine whether a power signature is represented in the set of parameters of the aggregate power waveform.

The charging decision circuit 204 may use the determined subset of the set of power signatures, and the set of relationships between the set of power signatures and the set of power sources, to identify a subset of the set of power sources that is contributing to the aggregate power waveform on the power line 208.

The power line 208 may be electrically coupled to an input of the charging circuit 206, and the charging circuit 206 may be configured to selectively provide power received on the power line 208 to a set of loads, such as one or more EVs 214. By way of example, the charging circuit 206 is shown to be part of the ACC 200. Alternatively, the charging circuit 206 may be incorporated into a device that is separate from the ACC 200. The charging circuit 206 may in some cases include a set of switches. The switches may be configured to switchably deliver power received on the power line 208 to one or more loads, such as one or more EVs 214.

The charging decision circuit 204 may be configured to control the charging circuit 206 responsive to the set of power sources that it identifies and, thus, control whether or when the EV(s) 214 are charged. For example, depending on the set of power sources that is contributing to the aggregate power waveform, the charging decision circuit 204 may operate one or more switches of the charging circuit 206, to thereby charge (or not charge) the EV(s) 214.

The set of parameters of the aggregate power waveform, and thus the subset of power sources identified by the charging decision circuit 204, may change over time. As a result, the charging decision circuit's decision to charge or not charge the EV(s) 214 may change over time. When determining whether or when to charge the EV(s) 214, the charging decision circuit 204 may consider, for example, the cost(s) of the identified power sources, the renewability or non-renewability of the identified power sources, parameters of the EV(s) 214 (e.g., a time by which an EV wants to be charged, an amount of charge wanted by the EV, a charging priority of the EV, a state of charge of the EV, a departure time of the EV, or a charge capacity of the EV), parameters of other devices that need to be powered or charged within the electrical power ecosystem of the ACC 200, and so on. The charging decision circuit 204 may receive or retrieve a set of parameters of one or more loads (e.g., the EV(s) 214), and/or receive or retrieve electronic instructions on how to implement various power efficiency metrics (e.g., metrics for efficiently using power), and control the charging circuit 206 in response to such load parameters or efficiency metrics in addition to an identified set of power sources that is contributing power to the aggregate power waveform carried on the power line 208. In some embodiments, the charging decision circuit 204 may receive a set of parameters of an EV over an International Standards Organization (ISO) 15118 interface of the ACC 200.

In some cases, the ACC 200 may further include an ecosystem topology and/or fault monitoring circuit 216, which monitoring circuit 216 may be implemented or instantiated at least partly by a processor, and/or by other circuits or components. The monitoring circuit 216 may monitor the power line 208 for signals such as power line communication (PLC) signals, which in some cases may include orthogonal frequency-division multiplexed (OFDM) PLC signals. In some embodiments, the monitoring circuit 216 may include a PLC (or OFDM PLC) transceiver that both transmits and receives PLC signals (or OFDM PLC signals) via the power line 208.

The monitoring circuit 216 may be used for a variety of purposes, and in some embodiments may be used to detect changes in the topology of an electrical power ecosystem and/or faults or noise in a power line network (e.g., in a network of power lines including the power line 208, which network of power lines carries an aggregate power waveform). Changes in the topology may include changes in the loads connected to the power line 208 and/or a power line network). The faults or noise may in some cases include faults or noise related to defects or deterioration of the insulation that surrounds and insulates the power line 208 and/or other power lines in the power line network. Topologies, topology changes, faults, and/or noise may be identified similarly to how a subset of power sources contributing to an aggregate power waveform is identified. For example, the monitoring circuit 216 may sense a set of parameters of the PLC signals over time, and retrieve a set of topology signatures and a set of relationships between the set of topology signatures and a set of topologies and/or a set of fault signatures and a set of relationships between the fault signatures and a set of faults. The monitoring circuit 216 may then determine, using the retrieved set(s) of signatures, a subset of the signatures represented in the set of parameters. The subset of the signatures, in combination with the set(s) of relationships, may be used by the monitoring circuit 216 to identify a subset of the set of topologies and/or a subset of the set of faults. The monitoring circuit 216 may provide indications of topologies and/or faults to a remote device, via the network interface 212, or via a display, indicator light, speaker, and so on of the ACC 200.

In some embodiments, the ACC 200 (or sensor circuit 202) may have terminals that can be hard-wired to a power feed. In some embodiments, the ACC 200 may have a connector (e.g., a plug) for detachably connecting the ACC 200 (or sensor circuit 202) to a power outlet, which power outlet is connected to a power line of an electrical power ecosystem.

In some embodiments, the ACC 200 may alternatively be configured and used as an adaptive power controller. In these embodiments, the charging decision circuit 204 may control a power circuit that provides power to one or more loads, instead of or in addition to controlling the charging of one or more loads.

Figure 3:
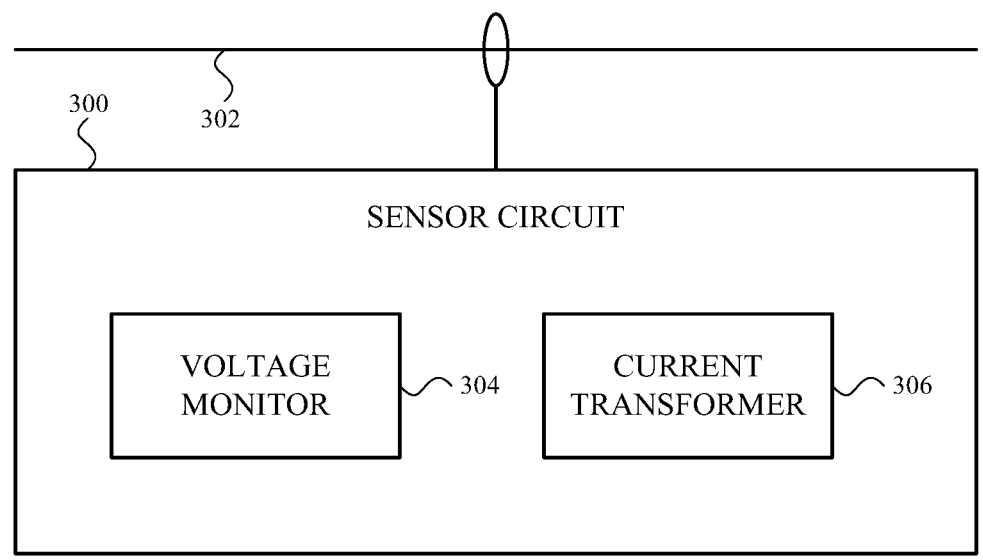
FIG. 3 depicts a block diagram illustrating a sensor circuit in accordance with embodiments of the present disclosure.

FIG. 3 shows an example of a sensor circuit 300, which is an example of the sensor circuit described with reference to FIG. 2. The sensor circuit 300 may be coupled to a power line 302 and include a voltage monitor 304 (i.e. voltage sensor) and/or a current transformer 306 (i.e. current sensor). The voltage monitor 304 may sense a voltage of the power line 302 over time, and the current transformer 306 may sense a current carried by the power line 302 over time. Outputs of the voltage monitor 304 and current transformer 306 may be provided to an ACC (or to a charging decision circuit of an ACC).

Figure 4:
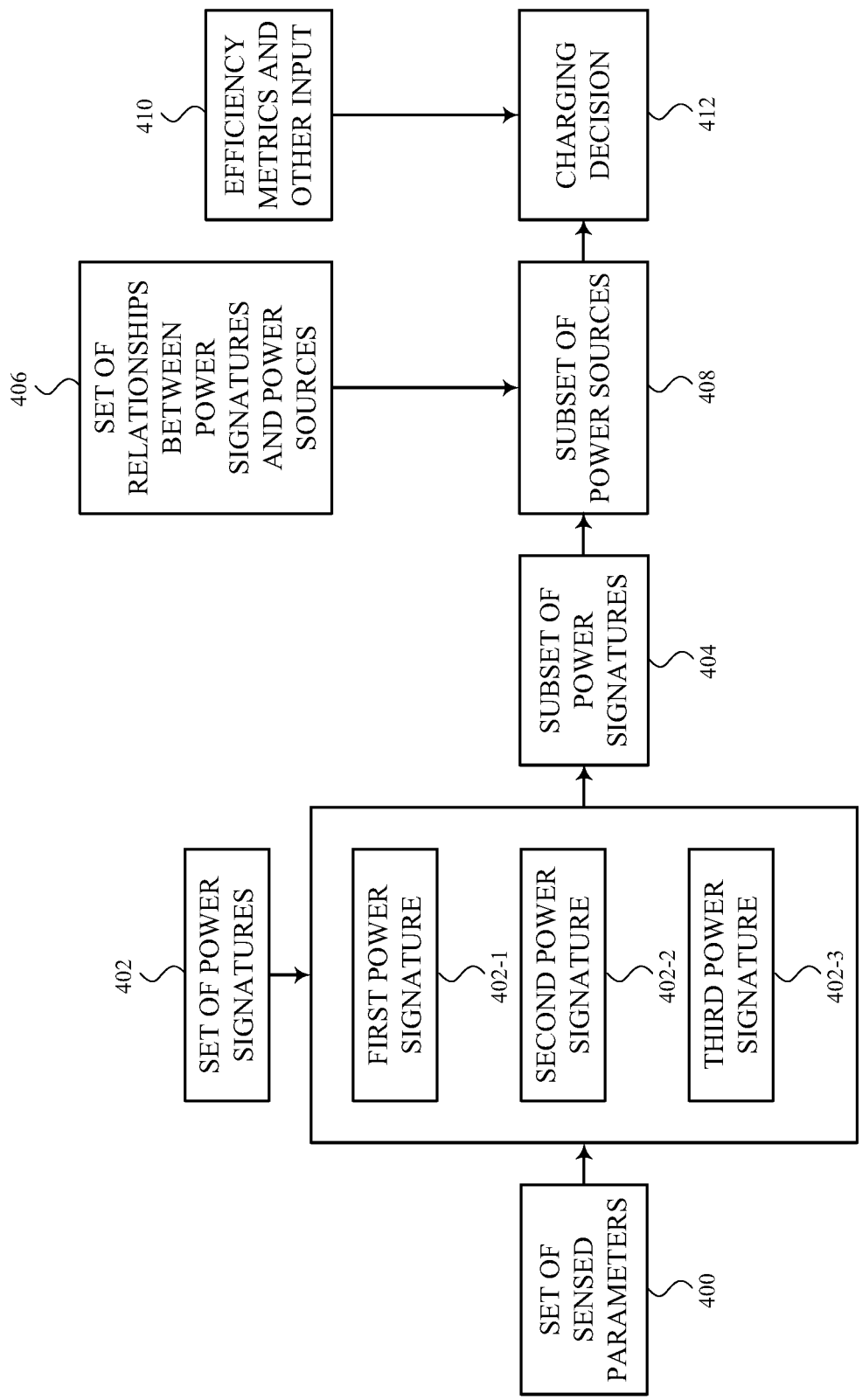
FIG. 4 depicts a flow diagram illustrating a plurality of operations that may be performed by a charging decision circuit in accordance with embodiments of the present disclosure.

FIG. 4 shows an example flow of some of the operations that may be performed by a charging decision circuit. In some cases, the operations may be performed by the charging decision circuit described with reference to FIG. 2.

The charging decision circuit may receive a set of parameters 400 of an aggregate power waveform, and may retrieve a set of power signatures 402 from a local memory or remote server. The charging decision circuit may then analyze the set of parameters 400 to determine whether one or more of the power signatures 402 (e.g., a first power signature 402-1, a second power signature 402-2, a third power signature 402-3, and so on) are represented in the set of parameters 400. The analysis may be performed, for example, using one or more of a pattern matching routine, machine learning, artificial intelligence (AI), and so on.

In some cases, a power signature may include a single set of parameter values. In other cases, a power signature may include a set of parameter value ranges, or different sets of parameter values, representing different combinations of parameter values that will result in a power signature match. Additionally or alternatively, the charging decision circuit may be programmed to indicate a match despite variances between a sensed set of parameters of an aggregate power waveform and a set of parameters associated with a power signature. When the charging decision circuit identifies a power signature as being represented in a set of sensed parameters, despite determining there is a variance between the sensed set of parameters and the set of parameters associated with the power signature, the charging decision circuit may update the set of parameters for the power signature to include the determined variance. In this manner, the charging decision circuit may be seeded with an initial or updated set of power signatures and then learn acceptable variances to the power signatures over time.

One output of the analysis described above may be a subset 404 of the set of power signatures 402, which subset 404 is represented in the sensed set of parameters 400. Another output of the analysis may be a variance or an updated set of parameters for a power signature (e.g., the first power signature 402-1), which variance or updated set of parameters may be used to update the set of power signatures 402.

The charging decision circuit may further retrieve a set of relationships 406 between the set of power signatures 402 and a set of power sources. The charging decision circuit may use the subset 404 of the set of power signatures 402, and the set of relationships 406 between the set of power signatures 402 and the set of power sources, to identify a subset 408 of the set of power sources, with the subset 408 including power sources that contribute to the aggregate power waveform.

In some cases, the charging decision circuit may use the subset 408 of power sources, in conjunction with a set of efficiency metrics 410 and/or other inputs, to make a charging decision 412 (e.g., an EV charging decision). In some cases, the charging decision circuit may trend the subset 408 over time, and adaptively schedule charging of an EV responsive to the trend. For example, the charging decision circuit may determine that solar power is generally available late in the day while an EV is plugged into its electrical power ecosystem, and schedule charging of the EV at that time. In some cases, the charging decision circuit may transmit the subset 408 of power sources, or a trend thereof, to an ACM. The charging decision circuit may then receive, from the ACM, a charging schedule for a set of loads (e.g., one or more EVs), or predictive charging information for the set of loads. The predictive charging information may be used by the charging decision circuit, for example, to locally establish a charging schedule for the set of loads.

Figure 5:
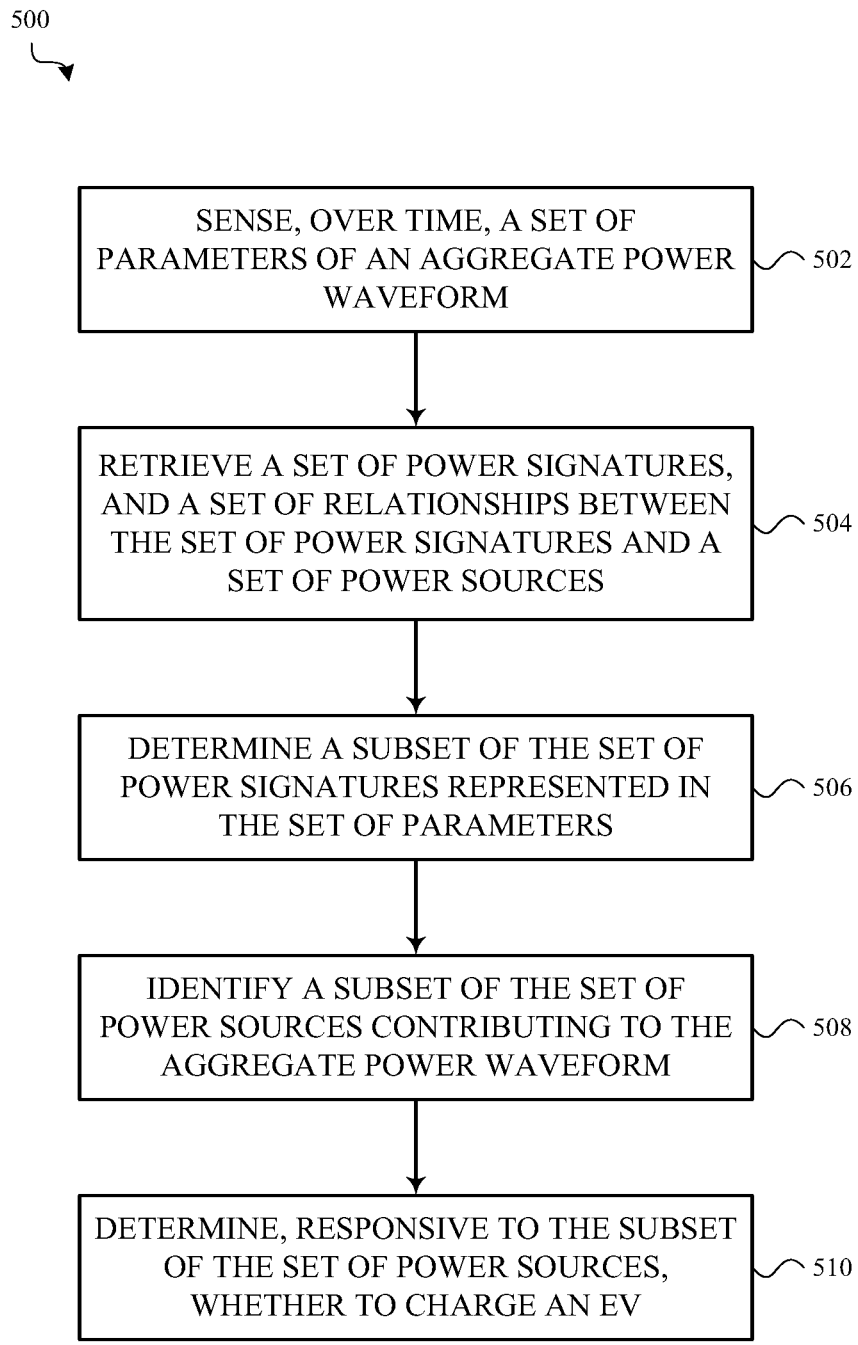
FIG. 5 depicts a flow chart illustrating a method that may be implemented by an ACC in accordance with embodiments of the present disclosure.

FIG. 5 shows a method 500 that may be implemented by any of the ACCs described herein. More particularly, the method 500 may be implemented by a sensing circuit, charging decision circuit, and/or processor of an ACC.

At block 502, the method 500 may include sensing, over time, a set of parameters of an aggregate power waveform carried on a power line. In some embodiments, the set of parameters may be sensed using a voltage monitor and/or a current transformer.

At block 504, the method 500 may include retrieving a set of power signatures, and a set of relationships between the set of power signatures and a set of power sources. In some embodiments, the set of power signatures and the set of relationships may be retrieved from a local memory or, alternatively, from a remote server.

At block 506, the method 500 may include determining, using the set of parameters and the set of power signatures, a subset of the set of power signatures represented in the set of parameters.

At block 508, the method 500 may include identifying, using the subset of the set of power signatures and the set of relationships between the set of power signatures and the set of power sources, a subset of the set of power sources contributing to the aggregate power waveform.

At block 510, the method 500 may include determining, responsive to the subset of the set of power sources, whether to charge an EV. Additionally or alternatively, the operation(s) at block 510 may include determining when to charge the EV (e.g., the operation(s) at block 510 may include scheduling a time to charge the EV, responsive to trending the subset of the set of power sources over time.

Figure 6:
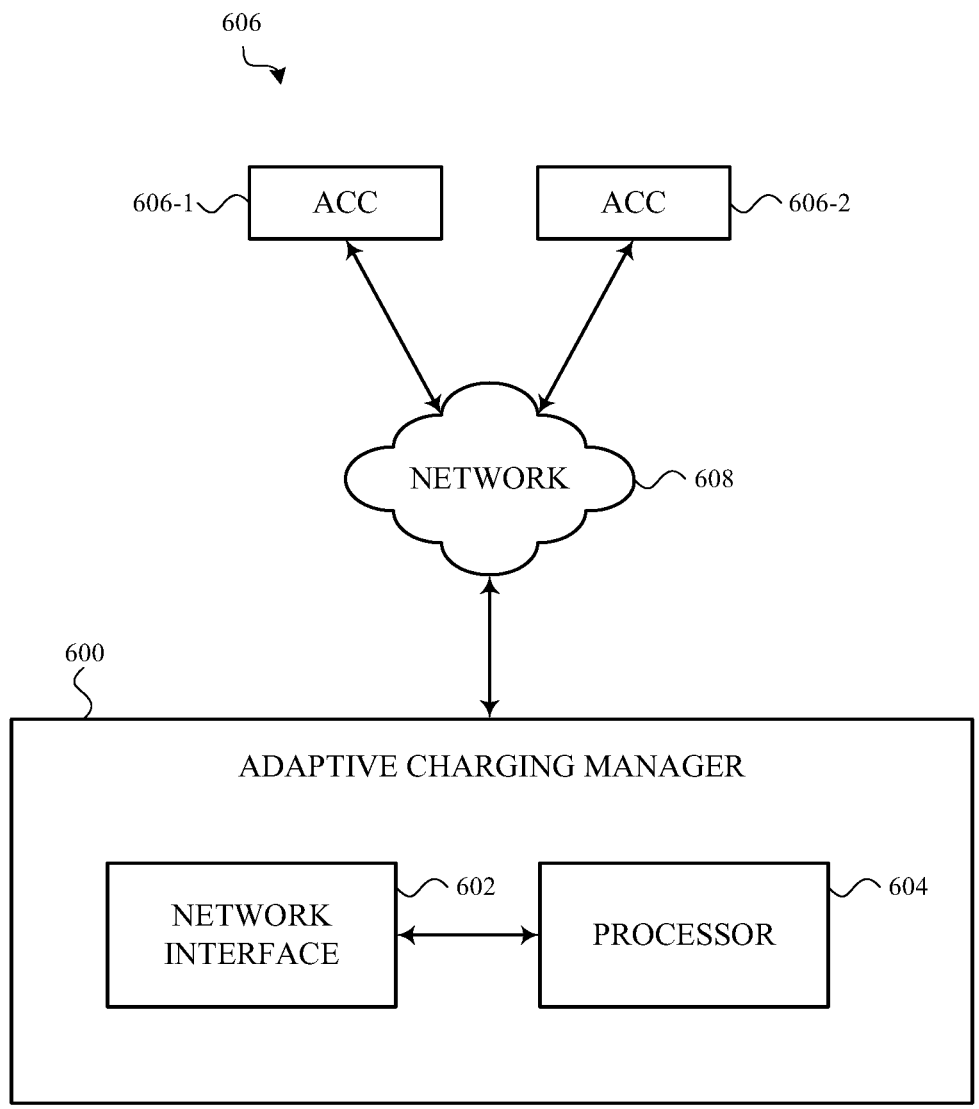
FIG. 6 depicts system diagram illustrating an adaptive charger monitor (ACM) coupled with a plurality of ACCs over a network in accordance with embodiments of the present disclosure.

FIG. 6 shows an example block diagram of an ACM 600. The ACM 600 may include a network interface 602 and a processor 604 and, in some cases, may communicate with a set of ACCs 606 over a network 608. The ACCs 606 may include any of the ACCs described herein and, by way of example, are shown to include a first ACC 606-1 and a second ACC 606-2. The network 608 may be or include any of the Internet, a local area network, a cellular radio network, and so on.

In some cases, the processor 604 may be configured to receive, over the network 608 and via the network interface 602, indications of available subsets of power sources identified by the set of ACCs 606. The processor 604 may determine a trend of available subsets of power sources for the ACCs 606. The trend may be based at least partly on indications of available subsets of power sources received from the first ACC 606-1, but may also be based on an indication of available subsets of power sources received from the second ACC 606-2 and/or other ACCs in the set of ACCs 606. Responsive to the trend of available subsets of power sources, the processor 604 may provide, to the second ACC 606-2, at least one of: predictive charging information for a set of loads charged responsive to an output of the second ACC 606-2, or a charging schedule for the set of loads of the second ACC 606-2. The predictive charging information or charging schedule may also be provided to the first ACC 606-1 and/or other ACCs.

In some cases, predictive charging information or a charging schedule for one ACC may be based on its own trend of available subsets of power sources and/or a trend of available subsets of power sources for it and/or other ACCs, after the ACM 600 determines that a relationship exists between the ACCs. For example, in the example provided in the preceding paragraph, the predictive charging information or charging schedule may be provided to the second ACC 606-2 after the ACM determines a relationship exists between the first ACC 606-1 and the second ACC 606-2. In some examples, the relationship may be determined to exist because of: a first similarity between a first set of loads charged responsive to an output of the first ACC 606-1 and a second set of loads charged responsive to an output of the second ACC 606-2 (e.g., both the first ACC 606-1 and the second ACC 606-2 may be charging EVs); a second similarity between a first operator of the first ACC 606-1 and a second operator of the second ACC 606-2 (e.g., both of the operators may be EV users, or both may be EV rental companies, or both may be operators of office buildings); and/or a third similarity between a first location of the first ACC 606-1 and a second location of the second ACC 606-2 (e.g., both the first ACC 606-1 and the second ACC 606-2 may be located in homes in the same neighborhood, or both the first ACC 606-1 and the second ACC 606-2 may be office buildings on the same street).

Figure 7:
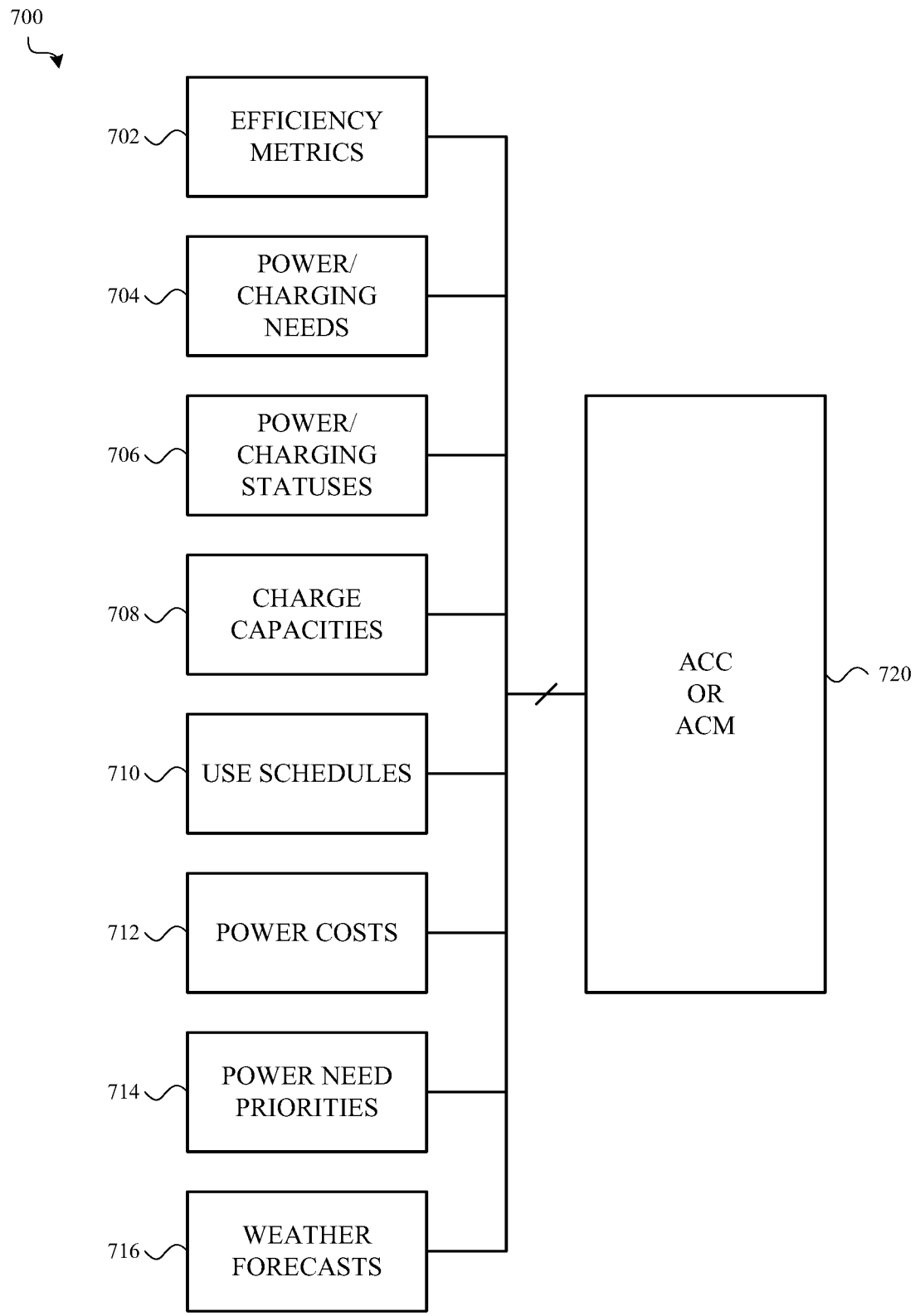
FIG. 7 depicts a block diagram illustrating an ACC or an ACM receiving a plurality of inputs in accordance with embodiments of the present disclosure.

FIG. 7 shows an example set of inputs 700 that may be provided to an ACC or ACM 720. The inputs 700 may include, for example, efficiency metrics 702, power (or charging) needs 704, power (or charging) statuses 706, charge capacities 708, use schedules 710 (e.g., scheduled departure times or trips for an EV), power costs 712, power need priorities 714, weather forecasts 716, and so on. Any or all of these inputs may be used, given priority, or weighed when determining whether or when to charge a load (e.g., an EV) while a particular subset of power sources are contributing to the aggregate power of an electrical power ecosystem. In some embodiments, the ACC or ACM 720 may use the power costs 712 to determine, responsive to a subset of power sources that is contributing to an aggregate power waveform, a cost of using the aggregate power waveform. The cost may be a total cost per kilowatt-hour, or the like, or the cost may be a cost for one or more of the contributing power sources. The ACC or ACM 720 may then determine whether to charge a load (e.g., an EV) at least partly in response to the cost of using the aggregate power waveform. The various inputs 700 may be provided, for example, via the network interface described with reference to FIG. 2.

Figure 8:
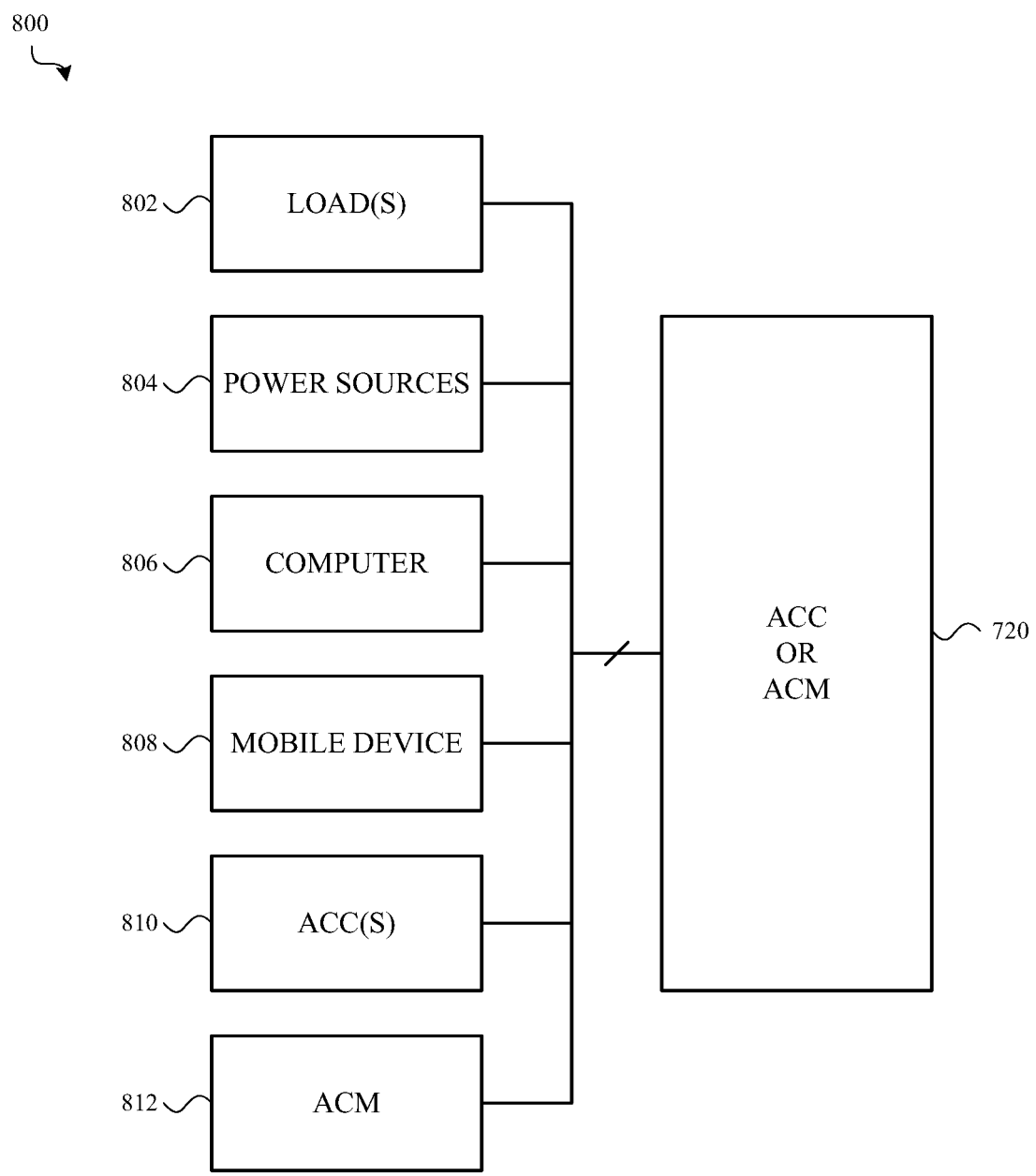
FIG. 8 depicts a block diagram illustrating an ACC or an ACM coupled with a plurality of devices that may provide one or more of the inputs of FIG. 7 in accordance with embodiments of the present disclosure.

FIG. 8 shows an example set of devices 800 that may provide the ACC or ACM inputs described with reference to FIG. 7. The devices 800 include, for example, a set of loads 802 (e.g., one or more EV s), a set of power sources 804, a computer 806 (e.g., a user's computer or a remote server), a mobile device 808 (e.g., a mobile phone), a set of ACCs 810, an ACM 812, and so on. The various devices 800 may provide their input via the network interface described with reference to FIG. 2.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device for providing adaptive charging of an electric vehicle (EV), the device comprising:
   a memory; and
   at least one processor configured for:
   receiving a set of parameters of an aggregate power waveform carried on a power line from a set of sensors;
   receiving a set of relationships between a set of power signatures and a set of power sources, wherein the set of power signatures includes respective sets of parameters for each power signature in the set of power signatures;
   determining, using the set of parameters and the set of power signatures, a subset of the set of power signatures represented in the set of parameters;
   identifying, using the subset of the set of power signatures and the set of relationships between the set of power signatures and the set of power sources, a subset of the set of power sources contributing to the aggregate power waveform;
   determining a variance between a set of parameters for a power signature in the set of power signatures and the set of parameters of the aggregate power waveform;
   identifying the power signature in the set of power signatures as represented in the set of parameters of the aggregate power waveform;
   updating, to include the determined variance, the set of parameters for the power signature in the set of power signatures; and
   controlling, responsive to identifying identified subset of the set of power sources, a charging circuit, wherein the charging circuit is configured to be electrically coupled between the power line and the EV.

2. The device of claim 1, wherein the set of sensors comprises:
   a voltage monitor configured to sense a voltage waveform; and
   a current monitor configured to sense a current waveform.

3. The device of claim 2, wherein the processor is further configured for using the set of parameters for determining a fundamental frequency and a set of harmonics of at least one of the voltage waveform and the current waveform, and determining the subset of the set of power signatures is further based on the fundamental frequency and the set of harmonics.

4. The device of claim 3, wherein the processor is further configured for using the set of parameters for determining a stability of the fundamental frequency, and determining the subset of the set of power signatures is further based on the stability of the fundamental frequency.

5. The device of claim 3, wherein the processor is further configured for using the set of parameters for determining a waveform stability of at least one of the voltage waveform and the current waveform, and determining the subset of the set of power signatures is further based on the waveform stability.

6. The device of claim 3, wherein the processor is further configured for using the set of parameters for determining a waveform shape of at least one of the voltage waveform and the current waveform, and determining the subset of the set of power signatures is further based on the waveform shape.

7. The device of claim 1 further comprising a network interface configured for receiving at least one of the set of power signatures and the set of relationships between the set of power signatures and the set of power sources.

8. The device of claim 1, wherein the processor is further configured for determining a trend the subset of the set of power sources over time, and controlling the charging circuit is further based on the trend.

9. The device of claim 1, wherein the processor is further configured for determining a cost associated with charging the EV based on the subset of the set of power sources, and controlling the charging circuit is further based on the cost.

10. The device of claim 1, wherein the processor is further configured for receiving EV parameters associated with the EV, and controlling the charging circuit is further based on the EV parameters.

11. The device of claim 10, wherein the EV parameters include at least three of:
   a time by which the EV wants to be charged;
   an amount of charge wanted by the EV;
   a charging priority of the EV;
   a state of charge of the EV;
   a departure time of the EV; and
   a charge capacity of the EV.

12. The device of claim 10, wherein EV parameters are determined over an International Standards Organization (ISO) 15118 interface.

13. The device of claim 1, wherein the set of power sources includes:
   a utility power feed;
   a battery;
   a solar inverter; and
   a generator.

14. The device of claim 1, wherein the set of sensors and the charging circuit are coupled to a user premises electrical power ecosystem, behind a utility power meter connected between the user premises electrical power ecosystem and a utility electrical power ecosystem.

15. A programmatic method implemented on at least one processor for adaptive charging of an electric vehicle (EV), the programmatic method comprising:
   receiving a set of parameters of an aggregate power waveform carried on a power line from a set of sensors;
   receiving a set of relationships between a set of power signatures and a set of power sources, wherein the set of power signatures includes respective sets of parameters for each power signature in the set of power signatures;
   determining, using the set of parameters and the set of power signatures, a subset of the set of power signatures represented in the set of parameters;
   identifying, using the subset of the set of power signatures and the set of relationships between the set of power signatures and the set of power sources, a subset of the set of power sources contributing to the aggregate power waveform;
   determining a variance between a set of parameters for a power signature in the set of power signatures and the set of parameters of the aggregate power waveform;
   identifying the power signature in the set of power signatures as represented in the set of parameters of the aggregate power waveform;
   updating, to include the determined variance, the set of parameters for the power signature in the set of power signatures; and
   controlling, responsive to identifying identified subset of the set of power sources, a charging circuit, wherein the charging circuit is configured to be electrically coupled between the power line and the EV.

16. A non-transitory computer-readable storage medium, the non-transitory computer-readable storage medium storing instructions to be implemented on at least one processor, the instructions when executed by the at least one processor cause a device to perform a programmatic method for adaptive charging of an electric vehicle (EV), the programmatic method comprising:
   receiving a set of parameters of an aggregate power waveform carried on a power line from a set of sensors;
   receiving a set of relationships between a set of power signatures and a set of power sources, wherein the set of power signatures includes respective sets of parameters for each power signature in the set of power signatures;
   determining, using the set of parameters and the set of power signatures, a subset of the set of power signatures represented in the set of parameters;
   identifying, using the subset of the set of power signatures and the set of relationships between the set of power signatures and the set of power sources, a subset of the set of power sources contributing to the aggregate power waveform;
   determining a variance between a set of parameters for a power signature in the set of power signatures and the set of parameters of the aggregate power waveform;
   identifying the power signature in the set of power signatures as represented in the set of parameters of the aggregate power waveform;
   updating, to include the determined variance, the set of parameters for the power signature in the set of power signatures; and
   controlling, responsive to identifying identified subset of the set of power sources, a charging circuit, wherein the charging circuit is configured to be electrically coupled between the power line and the EV.

17. The device of claim 1, wherein the set of power sources includes a utility power feed and the subset of the set of power sources includes at least one of a battery, a solar inverter, a generator, a wind power source, a geothermal power source, and a hydropower source.

* * * * *